(12) United States Patent
Chen et al.

(10) Patent No.: US 8,159,637 B2
(45) Date of Patent: Apr. 17, 2012

(54) LIQUID CRYSTAL DISPLAY AND SUBSTRATE THEREOF

(75) Inventors: Chien-Hong Chen, Miaoli County (TW); Chih-Yung Hsieh, Miaoli County (TW); Ying-Jen Chen, Miaoli County (TW); Chuan-Chung Wang, Miaoli County (TW); Ju-Hsien Chen, Miaoli County (TW)

(73) Assignee: Chimei Innolux Corporation, Miaoli County (TW)

( * ) Notice: Subject to any disclaimer, the term of this patent is extended or adjusted under 35 U.S.C. 154(b) by 199 days.

(21) Appl. No.: 12/768,832

(22) Filed: Apr. 28, 2010

(65) Prior Publication Data

US 2010/0289991 A1    Nov. 18, 2010

(30) Foreign Application Priority Data

May 15, 2009  (TW) ................................ 98116155 A

(51) Int. Cl.
*G02F 1/1335* (2006.01)
*G02F 1/1333* (2006.01)
*G02F 1/1343* (2006.01)

(52) U.S. Cl. .......................... 349/106; 349/138; 349/139
(58) Field of Classification Search .................... 349/56, 349/122, 108, 138, 139, 143, 144, 145, 158, 349/106
See application file for complete search history.

(56) References Cited

U.S. PATENT DOCUMENTS

| 6,603,524 B1 * | 8/2003 | Shimada et al. | 349/139 |
| 2007/0225096 A1 * | 9/2007 | Fujita | 474/202 |
| 2008/0180613 A1 * | 7/2008 | Matsumoto | 349/113 |
| 2010/0289991 A1 * | 11/2010 | Chen et al. | 349/106 |

* cited by examiner

*Primary Examiner* — Brian Healy
(74) *Attorney, Agent, or Firm* — Thomas|Kayden

(57) ABSTRACT

A liquid crystal display and a substrate thereof are provided. The substrate of the liquid crystal display has a plurality of first pixel areas, second pixel areas, and third pixel areas. The substrate of the liquid crystal display has a plurality of first insulating films disposed on the first pixel areas, a plurality of second insulating films disposed on the second pixel areas, and a plurality of third insulating films disposed on the third pixel areas. The dielectric coefficient of the first insulating film is greater than the dielectric coefficient of the second insulating film, and the dielectric coefficient of the second insulating film is greater than the dielectric coefficient of the third insulating film.

20 Claims, 8 Drawing Sheets

LIQUID CRYSTAL DISPLAY AND SUBSTRATE THEREOF

BACKGROUND

1. Field

This disclosure is related to a display and a substrate thereof, and more particularly, to a liquid crystal display and a substrate thereof.

2. Description of Related Art

Displays are commonly used for viewing multimedia content, and display technology has been evolving. For many years, cathode ray tube (CRT) displays were very popular due to their great display quality. However, the CRT displays had the shortcomings of high power consumption and high radiation. In recent years, as optoelectronic and semiconductor technologies have progressed, flat panel display technology has improved as well. For example, liquid crystal displays have gradually become more common due to their high display quality, low operating voltage, low power consumption, small volume, and lack of radiation.

FIG. 1A is a schematic diagram that illustrates a cross-sectional view of a portion of a conventional liquid crystal display. Referring to FIG. 1A, a liquid crystal display 100 has a plurality of first pixel areas 100B, a plurality of second pixel areas 100G, and a plurality of third pixel areas 100R. Furthermore, the liquid crystal display 100 includes a first substrate 120, a second substrate 110, a liquid crystal layer 130 disposed between the first substrate 120 and the second substrate 110, and a backlight module 140.

The backlight module 140 is capable of providing a light source to the first pixel areas 100B, the second pixel areas 100G, and the third pixel areas 100R. The light of the backlight module 140 passes through the first pixel areas 100B, the second pixel areas 100G, and the third pixel areas 100R to generate a blue light, a green light, and a red light, respectively.

FIG. 1B is a graph of various driving voltages versus corresponding light transmission rates (V-T curves) of the liquid crystal display depicted in FIG. 1A. Referring to FIG. 1B, voltage is represented on the horizontal axis, and the light transmission rate is represented on the vertical axis. The curve CB, the curve CG, and the curve CR respectively show the relationships of the driving voltages of the liquid crystal display 100 and the corresponding light transmission rates of the blue light, the green light, and the red light.

As shown in FIG. 1B, the light transmission rates of the blue light, the green light, and the red light generated from the light of backlight module 140 by respectively passing through the first pixel areas 100B, the second pixel areas 100G, and the third pixel areas 100R are different. Under the same driving voltage, the light transmission rate of the blue light is greater than the light transmission rate of the green light, and the light transmission rate of the green light is greater than the light transmission rate of the red light. That is to say, the light having shorter wavelength has greater light transmission rate.

However, the difference of the light transmission rates of different color light may cause color shifting during displaying so as to detrimentally affect the display quality of the liquid crystal display 100.

SUMMARY

The disclosure provides a substrate of a liquid crystal display that reduces the difference of the light transmission rates of different color light. Also, the disclosure further provides a liquid crystal display having the abovementioned substrate so that color shifting during image displaying is mitigated.

For example, the disclosure provides a substrate of a liquid crystal display has a plurality of first pixel areas, a plurality of second pixel areas, and a plurality of third pixel areas. In addition, a plurality of first insulating films, a plurality of second insulating films, and a plurality of third insulating films respectively in the first pixel areas, the second pixel areas, and the third pixel areas are disposed on the substrate of the liquid crystal display. Dielectric coefficients of the first insulating films are substantially greater than dielectric coefficients of the second insulating films and the dielectric coefficients of the second insulating films are substantially greater than dielectric coefficients of the third insulating films.

The disclosure further provides a substrate of a liquid crystal display having a plurality of first pixel areas, a plurality of second pixel areas, and a plurality of third pixel areas. A dielectric coefficient of the substrate of the liquid crystal display in the first pixel areas is greater than that in the second pixel areas and the dielectric coefficient of the substrate of the liquid crystal display in the second pixel areas is greater than that in the third pixel areas.

The disclosure further provides a liquid crystal display having a plurality of first pixel areas, a plurality of second pixel areas, and a plurality of third pixel areas. Furthermore, the liquid crystal display includes a first substrate, a second substrate, and a liquid crystal layer disposed between the first substrate and the second substrate. A plurality of first insulating films, a plurality of second insulating films, and a plurality of third insulating film respectively in the first pixel areas, the second pixel areas, and the third pixel areas are disposed on the first substrate. Dielectric coefficients of the first insulating films are substantially greater than dielectric coefficients of the second insulating films and the dielectric coefficients of the second insulating films are substantially greater than dielectric coefficients of the third insulating films.

In some embodiments, the first insulating film is a first color filter film, the second insulating film is a second color filter film, and the third insulating film is a third color filter film.

In some embodiments, each of the first insulating films includes a first color filter film and a first dielectric coefficient adjusting film, each of the second insulating films includes a second color filter film and a second dielectric coefficient adjusting film, and the third insulating film is a third color filter film. A dielectric coefficient of the first dielectric coefficient adjusting film is substantially greater than a dielectric coefficient of the second dielectric coefficient adjusting film.

In some embodiments, each of the first insulating films includes a first color filter film and a first dielectric coefficient adjusting film, each of the second insulating films includes a second color filter film and a second dielectric coefficient adjusting film, and each of the third insulating film includes a third color filter film and a third dielectric coefficient adjusting film. A dielectric coefficient of the first dielectric coefficient adjusting film is substantially greater than a dielectric coefficient of the second dielectric coefficient adjusting film and the dielectric coefficient of the second dielectric coefficient adjusting film is substantially greater than a dielectric coefficient of the third dielectric coefficient adjusting film.

In some embodiments, the first color filter film is, for example, a blue color filter film, the second color filter film is, for example, a green color filter film, and the third color filter film is, for example, a red color filter film.

In some embodiments, a plurality of pixel electrodes, a plurality of scan lines, a plurality of data lines, and a plurality of active devices are further disposed on the first substrate of the liquid crystal display. The scan lines are substantially parallel and arranged in a first direction, the data lines are substantially parallel and arranged in a second direction, and the data lines and the scan lines define the first pixel areas, the second pixel areas, and the third pixel areas. Each of the active devices is located in the corresponding first pixel area, the corresponding second pixel area, or the corresponding third pixel area, and driven by the corresponding scan line. Each of the pixel electrodes is located in the corresponding first pixel area, the corresponding second pixel area, or the corresponding third pixel area, and electrically connected to the corresponding active device to receive a signal transmitted through the corresponding data line.

In some embodiments, a common electrode layer is further disposed on the first substrate of the liquid crystal display.

In some embodiments, a plurality of pixel electrodes, a plurality of scan lines, a plurality of data lines, and a plurality of active devices are further disposed on one of the first substrate and the second substrate. The scan lines are substantially parallel and arranged in a first direction, the data lines are substantially parallel and arranged in a second direction, and the data lines and the scan lines define the first pixel areas, the second pixel areas, and the third pixel areas. Each of the active devices is located in the corresponding first pixel area, the corresponding second pixel area, or the corresponding third pixel area, and driven by the corresponding scan line. Each of the pixel electrodes is located in the corresponding first pixel area, the corresponding second pixel area, or the corresponding third pixel area, and electrically connected to the corresponding active device to receive a signal transmitted through the corresponding data line.

In some embodiments, a plurality of pixel electrodes, a plurality of scan lines, a plurality of data lines, and a plurality of active devices are further disposed on the second substrate. The scan lines are substantially parallel and arranged in a first direction, the data lines are substantially parallel and arranged in a second direction, and the data lines and the scan lines define the first pixel areas, the second pixel areas, and the third pixel areas. Each of the active devices is located in the corresponding first pixel area, the corresponding second pixel area, or the corresponding third pixel area, and driven by the corresponding scan line. Each of the pixel electrodes is located in the corresponding first pixel area, the corresponding second pixel area, or the corresponding third pixel area, and electrically connected to the corresponding active device to receive a signal transmitted through the corresponding data line. In addition, a common electrode layer is further disposed on the first substrate.

In some embodiments, the pixel electrodes in the first pixel areas have a plurality of first slits, the pixel electrodes in the second pixel areas have a plurality of second slits, and the pixel electrodes in the third pixel areas have a plurality of third slits. Widths of the first slits are substantially greater than widths of the second slits, and the widths of the second slits are substantially greater than widths of the third slits.

In some embodiments, the common electrode has a plurality of first slits in the first pixel areas, a plurality of second slits in the second pixel areas, and a plurality of third slits in the third pixel areas. Widths of the first slits are substantially greater than widths of the second slits, and the widths of the second slits are substantially greater than widths of the third slits.

In some embodiments, a plurality of first protrusions, a plurality of second protrusions, and a plurality of third protrusions respectively in the first pixel areas, the second pixel areas, and the third pixel areas are further disposed on the first substrate of the liquid crystal display. Furthermore, the first protrusions, the second protrusions, and the third protrusions are disposed on the pixel electrodes. Widths of the first protrusions are substantially greater than widths of the second protrusions, and the widths of the second protrusions are substantially greater than widths of the third protrusions.

In some embodiments, a plurality of first protrusions, a plurality of second protrusions, and a plurality of third protrusions respectively in the first pixel areas, the second pixel areas, and the third pixel areas are further disposed on the (first) substrate of the liquid crystal display. Furthermore, the first protrusions, the second protrusions, and the third protrusions are disposed on the common electrode layer. Widths of the first protrusions are substantially greater than widths of the second protrusions, and the widths of the second protrusions are substantially greater than widths of the third protrusions.

In some embodiments, a plurality of first protrusions, a plurality of second protrusions, and a plurality of third protrusions respectively in the first pixel areas, the second pixel areas, and the third pixel areas are further disposed on the second substrate. Furthermore, the first protrusions, the second protrusions, and the third protrusions are disposed on the common electrode layer. Widths of the first protrusions are substantially greater than widths of the second protrusions, and the widths of the second protrusions are substantially greater than widths of the third protrusions.

In some embodiments, a plurality of first protrusions, a plurality of second protrusions, and a plurality of third protrusions respectively in the first pixel areas, the second pixel areas, and the third pixel areas are further disposed on the second substrate. Furthermore, the first protrusions, the second protrusions, and the third protrusions are disposed on the pixel electrodes. Widths of the first protrusions are substantially greater than widths of the second protrusions, and the widths of the second protrusions are substantially greater than widths of the third protrusions.

In some embodiments, a plurality of first color filter films, a plurality of second color filter films, and a plurality of third color filter films respectively in the first pixel areas, the second pixel areas, and the third pixel areas are further disposed on the second substrate. In addition, the common electrode layer covers the first color filter films, the second color filter films, and the third color filter films.

In some embodiments, a plurality of first color filter films, a plurality of second color filter films, and a plurality of third color filter films respectively in the first pixel areas, the second pixel areas, and the third pixel areas are further disposed on the second substrate.

In some embodiments, the liquid crystal display further includes a backlight module and the first substrate, the second substrate, and the liquid crystal layer are disposed on the backlight module.

Accordingly, a substrate of a liquid crystal display having a plurality of pixel areas is provided according to the disclosure, and the pixel areas can have varying dielectric coefficients. The substrate of the liquid crystal display in the liquid crystal display improves the consistency of the light transmission rates so that the color shifting caused by the varying light transmission rates of light having different wavelengths is mitigated.

In order to make the aforementioned and other features and advantages of the disclosure more comprehensible, several embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate various embodiments and, together with the description, serve to explain the principles of the disclosure.

DETAILED DESCRIPTION

As will be described in further detail below, the liquid crystal display has a plurality of first pixel areas, a plurality of second pixel areas, and a plurality of third pixel areas, and dielectric coefficient thereof in the first pixel areas is substantially greater than the dielectric coefficient thereof in the second pixel areas. Further, a dielectric coefficient of a substrate of the liquid crystal display in the second pixel areas is substantially greater than that in the third pixel areas. Accordingly, the light transmission rates of the light with different wavelengths are more consistent by rendering the light with different wavelengths pass through the pixel areas with different dielectric coefficients.

Figure 1A:
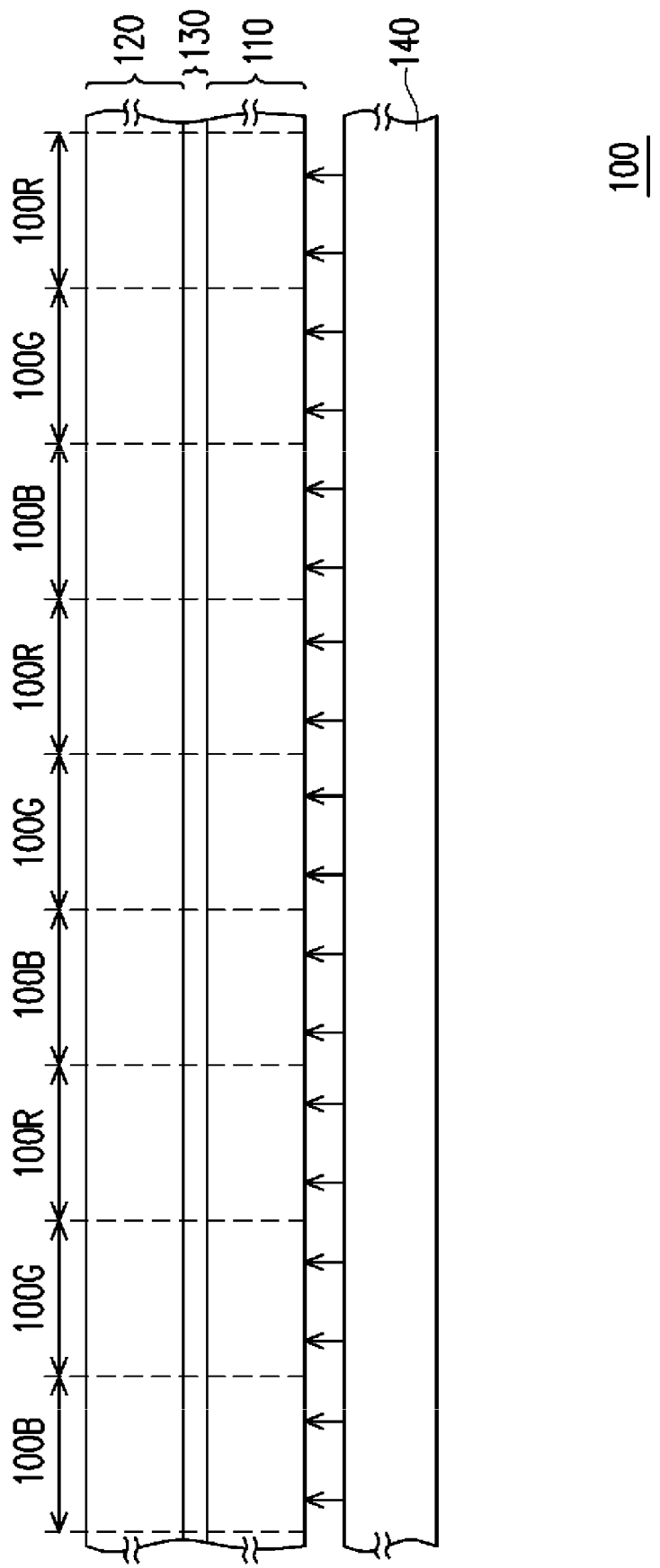
FIG. 1A is a schematic diagram that illustrates a cross-sectional view of a portion of a conventional liquid crystal display.
Figure 1B:
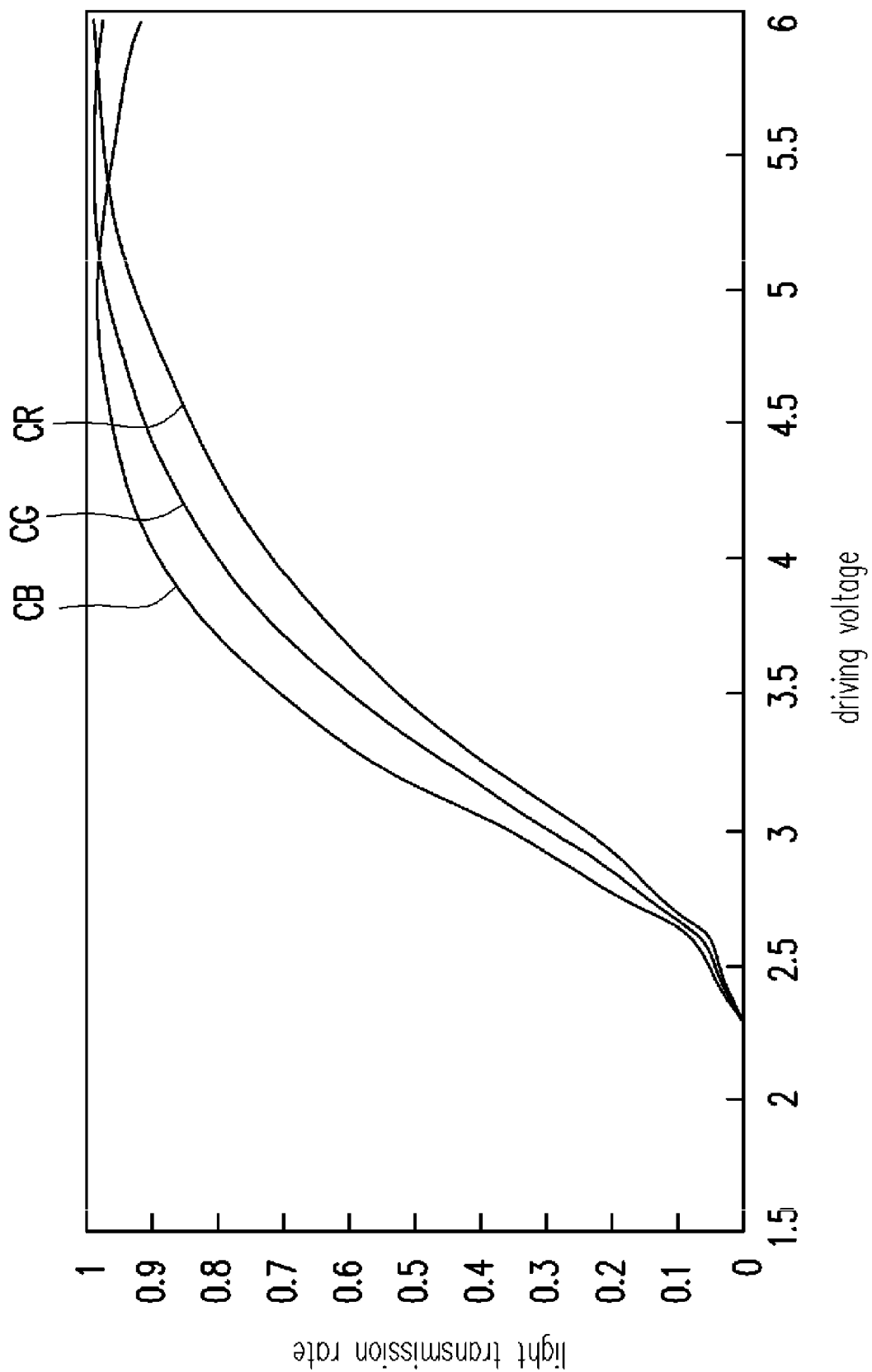
FIG. 1B is a graph of various driving voltages versus corresponding light transmission rates of the liquid crystal display depicted in FIG. 1A.
Figure 2A:
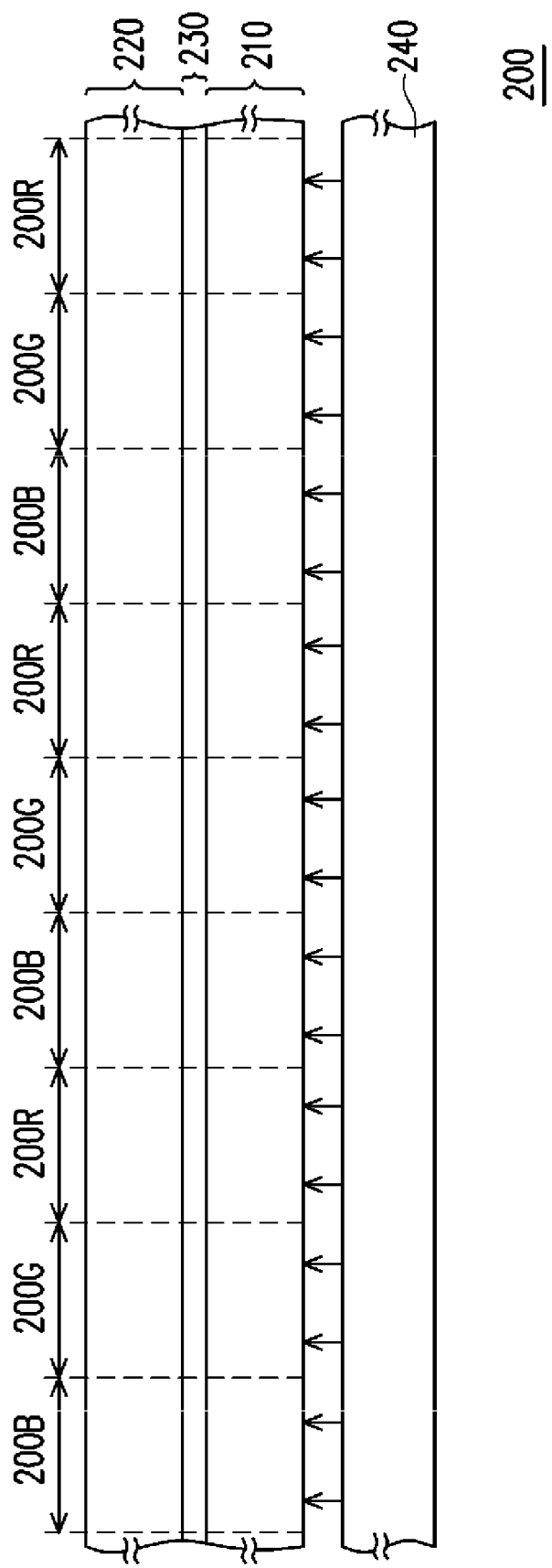
FIG. 2A is a schematic diagram that illustrates a cross-sectional view of a portion of a liquid crystal display according to an embodiment of the disclosure.

FIG. 2A is a schematic diagram that illustrates a cross-sectional view of a portion of a liquid crystal display according to an embodiment. Referring to FIG. 2A, a liquid crystal display 200 of the present embodiment has a plurality of first pixel areas 200B, a plurality of second pixel areas 200G, and a plurality of third pixel areas 200R. The liquid crystal display 200 includes a first substrate 210, a second substrate 220, and a liquid crystal layer 230 disposed between the first substrate 210 and the second substrate 220.

Furthermore, the liquid crystal display 200 of the present embodiment further includes a backlight module 240, and the first substrate 210, the second substrate 220, and the liquid crystal layer 230 are disposed on the backlight module 240. The backlight module 240 is capable of providing a light source to the first pixel areas 200B, the second pixel areas 200G, and the third pixel areas 200R for rendering the liquid crystal display 200 display an image. The light emitted from the backlight module 240 passes through the first pixel areas 200B, the second pixel areas 200G, and the third pixel areas 200R to generate a blue light, a green light, and a red light, respectively.

Figure 2B:
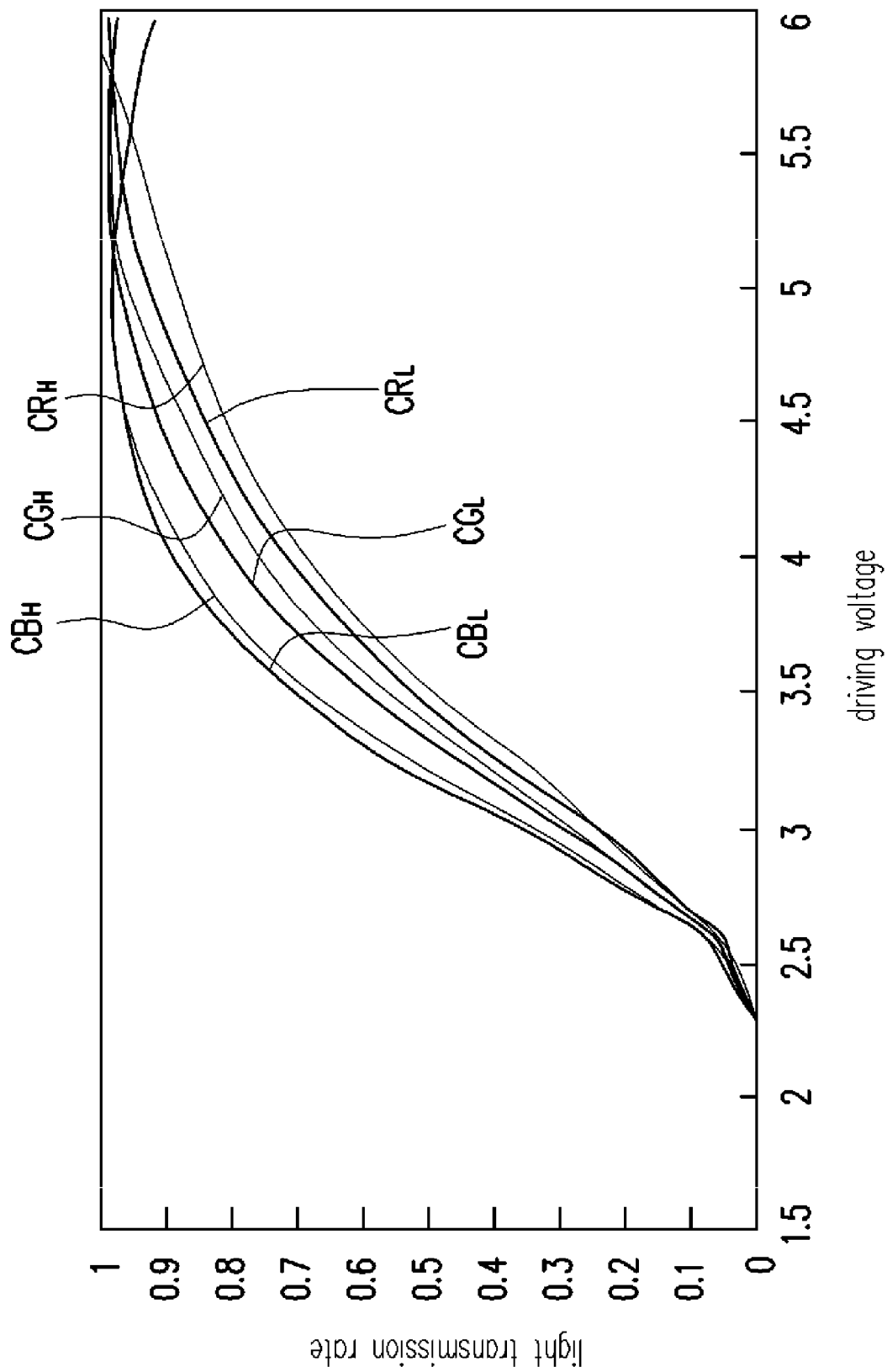
FIG. 2B is a graph of various driving voltages versus corresponding light transmission rates of two liquid crystal displays according to the embodiment illustrated in FIG. 2A.

FIG. 2B a graph of various driving voltages versus corresponding light transmission rates (V-T curve) of two liquid crystal displays according to the present embodiment. Referring to FIG. 2B, two materials respectively having dielectric coefficients $K_H$ and $K_L$ adopted in the present embodiment are respectively disposed on the first substrate 210 or the second substrate 220 of the liquid crystal display 200 depicted in FIG. 2A. The relationships of the driving voltages and the corresponding light transmission rates (V-T curve) of the two liquid crystal displays (not shown) are measured and shown in FIG. 2B. In the present embodiment, the dielectric coefficient $K_H$ is substantially greater than the dielectric coefficient $K_L$.

Voltage is represented on the horizontal axis, and light transmission rate is represented on the vertical axis. The curve $CB_H$, the curve $CG_H$, and the curve $CR_H$ respectively show the relationships of the driving voltages and the corresponding light transmission rates of the blue light, the green light, and the red light when the material having the dielectric coefficient $K_H$ is adopted. The curve $CB_L$, the curve $CG_L$, and the curve $CR_L$ respectively show the relationships of the driving voltages and the light transmission rates of the blue light, the green light, and the red light when the material having the dielectric coefficient $K_L$ is adopted.

Referring to FIG. 2A and FIG. 2B simultaneously, the curve CB, the curve CG, and the curve CR are quite different curves when the material having dielectric coefficient $K_H$ is adopted. In another aspect, the curve CB, the curve CG, and the curve CR are also quite different curves when the material having dielectric coefficient $K_L$ is adopted.

However, if the material having the dielectric coefficient $K_H$ is disposed in the first pixel areas 200B and the material having the dielectric coefficient $K_L$ is disposed in the third pixel areas 200R, the V-T curves of the blue light and the red light are respectively the curve $CB_H$ and the curve $CR_L$. Accordingly, the light transmission rates of the blue light, the green light, and the red light generated by the liquid crystal display 200 can be closer by adjusting the dielectric coefficients of the first pixel areas 200B, the second pixel areas 200G, and the third pixel areas 200R in the present embodiment.

Three additional embodiments illustrating the liquid crystal display having the first pixel areas, the second pixel areas, and the third pixel areas with different dielectric coefficients are provided hereafter, although the disclosure is not limited to only the following implementations.

The First Embodiment

Figure 3A:
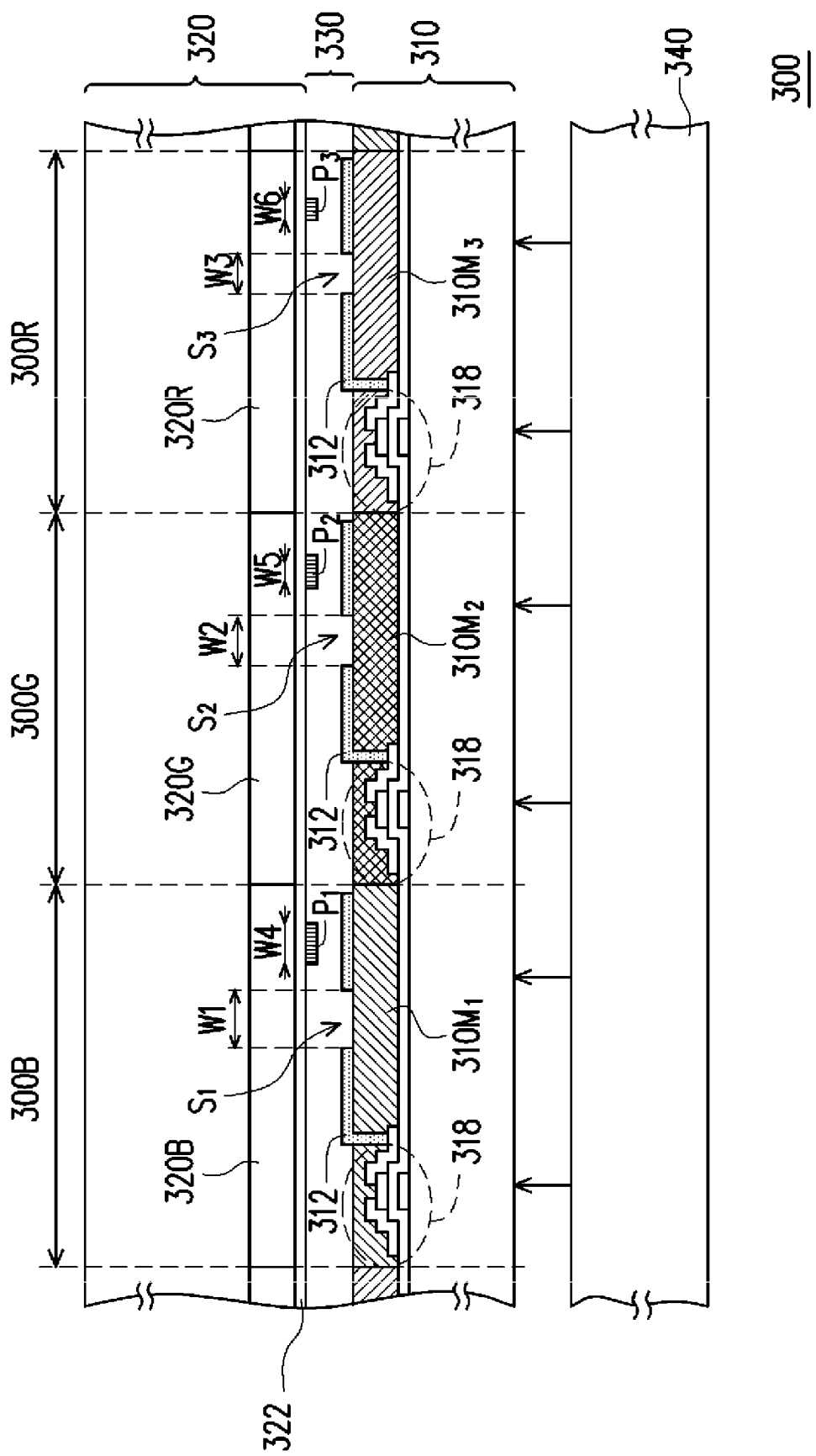
FIG. 3A is a schematic diagram that illustrates a cross-sectional view of a portion of a liquid crystal display according to a first embodiment.
Figure 3B:
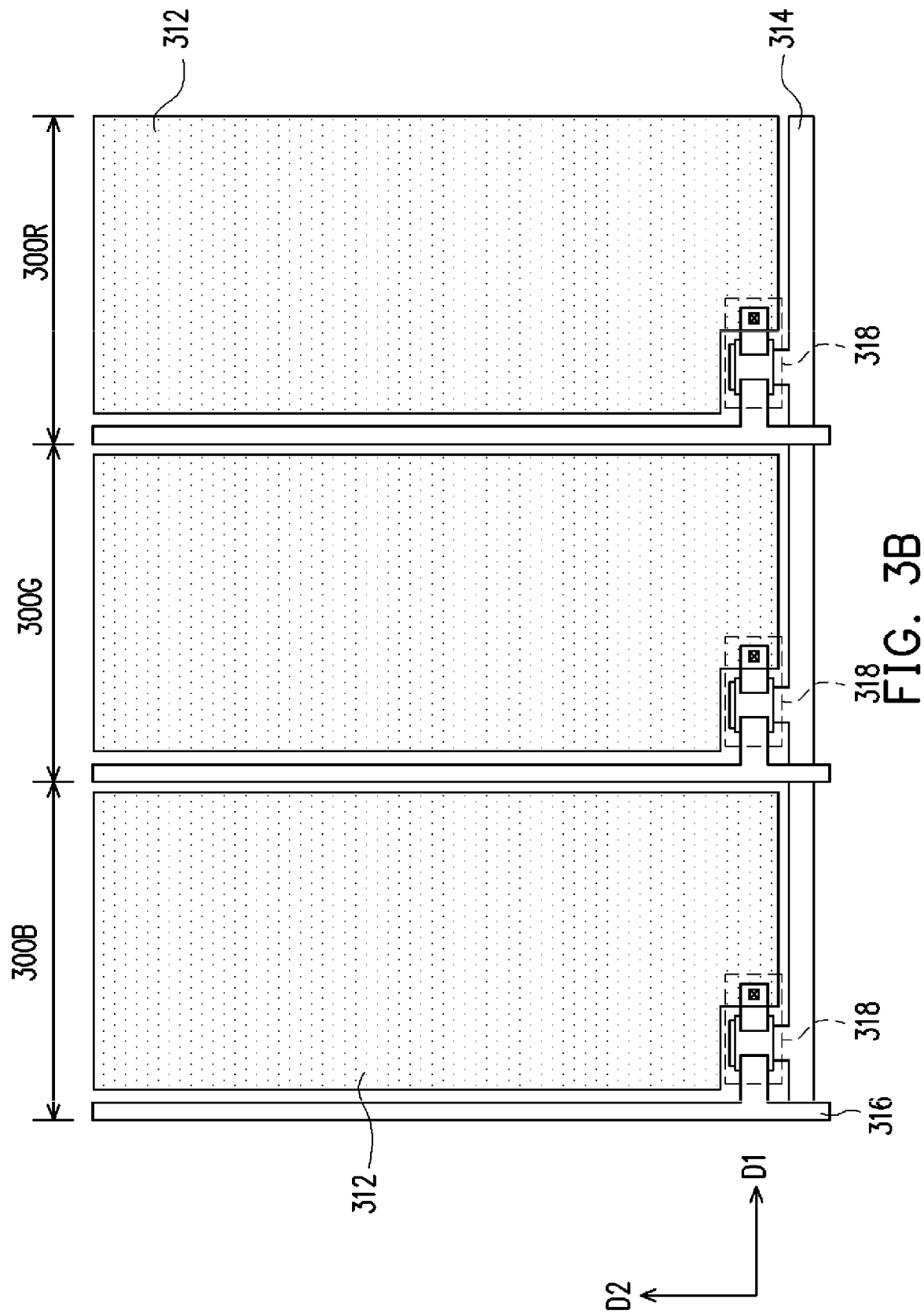
FIG. 3B is a schematic diagram that illustrates a partial top view of the first substrate depicted in FIG. 3A.

FIG. 3A is a schematic diagram that illustrates a cross-sectional view of a portion of a liquid crystal display according to a first embodiment. FIG. 3B is a schematic diagram that illustrates a partial top view of the first substrate depicted in FIG. 3A. Referring to FIG. 3A and FIG. 3B simultaneously, a liquid crystal display 300 of the present embodiment has a plurality of first pixel areas 300B, a plurality of second pixel areas 300G, and a plurality of third pixel areas 300R, wherein only one first pixel area 300B, one second pixel area 300G, and one third pixel area 300R are illustrated in FIG. 3A and FIG. 3B as an example. In addition, the liquid crystal display 300 includes a first substrate 310, a second substrate 320 and a liquid crystal layer 330 disposed between the first substrate 310 and the second substrate 320.

A first insulating film $310M_1$, a second insulating film $310M_2$, and a third insulating film $310M_3$ respectively in the first pixel area 300B, the second pixel area 300G, and the third pixel area 300R are disposed on the first substrate 310. A dielectric coefficient of the first insulating film $310M_1$ is substantially greater than a dielectric coefficient of the second insulating film $310M_2$, and the dielectric coefficient of the second insulating film $310M_2$ is substantially greater than a dielectric coefficient of the third insulating film $310M_3$.

A plurality of pixel electrodes 312, a plurality of scan lines 314 (only one scan line 314 is illustrated in FIG. 3B as an example), a plurality of data lines 316, and a plurality of active devices 318 are further disposed on the first substrate 310 of the present embodiment, wherein the first insulating film $310M_1$, the second insulating film $310M_2$, and the third insulating film $310M_3$ are, for example, disposed under the pixel electrodes 312. The scan lines 314 are substantially parallel and arranged in a first direction D1, the data lines 316 are substantially parallel and arranged in a second direction D2, and the data lines 316 and the scan line 314 define the first pixel areas 300B, the second pixel areas 300G, and the third pixel areas 300R. Each of the active devices 318 is respectively located in the corresponding first pixel area 300B, the corresponding second pixel area 300G, and the corresponding third pixel area 300R, and driven by the corresponding scan line 314. In another aspect, each of the pixel electrodes 312 are located in the corresponding first pixel area 300B, the corresponding second pixel area 300G, and the corresponding third pixel area 300R, and electrically connected to the corresponding active device 318 to receive a signal transmitted through the corresponding data line 316.

Using a transmissive liquid crystal display or a transreflective liquid crystal display as an example, the liquid crystal display 300 of the present embodiment as shown in FIG. 3A further includes a backlight module 340, and the first substrate 310, the second substrate 320, and the liquid crystal layer 330 are disposed on the backlight module 340, wherein the backlight module 340 provides the light source of the liquid crystal display 300. However, in other embodiments, the liquid crystal display 300 can be a reflective liquid crystal display. That is to say, the method or the manner how the liquid crystal display 300 of the present embodiment obtains the light source is not restricted.

Referring to FIG. 3A continuously, in the present embodiment, a plurality of first color filter films 320B, a plurality of second color filter films 320G, a plurality of third color filter films 320R, and a common electrode layer 322 are further disposed on the second substrate 320, wherein the first color filter films 320B, the second color filter films 320G, and the third color filter films 320R are respectively in the first pixel areas 300B, the second pixel areas 300G, and the third pixel areas 300R. In addition, the common electrode layer 322 covers the first color filter films 320B, the second color filter films 320G, and the third color filter films 320R. Certainly, in other embodiments, the first color filter films 320B, the second color filter films 320G, and the third color filter films 320R depicted in FIG. 3A can be disposed on the first substrate 310.

In the present embodiment, the first color filter films 320B are, for example, blue color filter films, the second color filter films are, for example, green color filter films, and the third color filter films 320R are, for example, red color filter films. The backlight module 340 provides the backlight source to the first pixel area 300B, the second pixel area 300G, and the third pixel area 300R so that the liquid crystal display 300 can display an image when the active devices 318 in the first pixel area 300B, the second pixel area 300G, and the third pixel area 300R are driven by the corresponding scan line 314 to render the corresponding pixel electrodes 312 receive the corresponding signals transmitted through the corresponding data lines 316.

Specifically, a portion of the light of the backlight source passes through the first insulating film $310M_1$ in the first pixel area 300B and the first color filter film 320B (the blue color filter film), another portion of the light of the backlight source passes through the second insulating film $310M_2$ in the second pixel area 300G and the second color filter film 320G (the green color filter film), and the rest portion of the light of the backlight source passes through the third insulating film $310M_3$ in the third pixel area 300R and the third color filter film 320R (the red color filter film). The dielectric coefficient of the first insulating film $310M_1$ is substantially greater than the dielectric coefficient of the second insulating film $310M_2$ and the dielectric coefficient of the second insulating film $310M_2$ is substantially greater than the dielectric coefficient of the third insulating film $310M_3$. Therefore, an actual applied voltage to the liquid crystal layer through the first insulating film $310M_1$ is smaller than that applied to the liquid crystal layer through the second insulating film $310M_2$, the actual applied voltage to the liquid crystal layer through the second insulating film $310M_2$ is smaller than that applied to the liquid crystal layer through the third insulating film $310M_3$. That is to say, the light transmission rate of the backlight source in the first pixel area 300B configured with the first insulating film $310M_1$ is less than that in the first pixel area 300B without the first insulating film $310M_1$ so that less portion of the light passes through the first color filter film 320B. The light transmission rate of the backlight source in the third pixel area 300R is greater so that more portion of the light passes through the third color filter film 320R. Therefore, the light transmission rates of the blue light, the green light, and the red light generated by the light passing through the first pixel area 300B, the second pixel area 300G, and the third pixel area 300R respectively are more consistent so as to mitigate the color shifting of the liquid crystal display 300 during displaying.

Besides, the abovementioned first pixel area 300B, the second pixel area 300G, and the third pixel area 300R can be implemented in a multi-domain vertical alignment (MVA) liquid crystal display. Referring to FIG. 3A, in the present embodiment, the pixel electrodes 312 located in the first pixel areas 300B have a plurality of first slits $S_1$, the pixel electrodes 312 located in the second pixel areas 300G have a plurality of second slits $S_2$, and the pixel electrodes 312 located in the third pixel areas 300R have a plurality of third slits $S_3$. Only one first slit $S_1$, one second slit $S_2$, and one third slit $S_3$ are illustrated in FIG. 3A as an example. Furthermore, the first slit $S_1$, the second slit $S_2$, and the third slit $S_3$ facilitate the change of the nearby electric field to render the liquid crystal molecules of the liquid crystal layer 330 arranged in a multi-domain arrangement so that the liquid crystal display 300 has the display quality of wider viewing-angle.

The electric field in the center of the slit is too weak to provide a smaller force on the liquid crystal molecules so as to reduce the light transmission rate. When a width W1 of the first slit $S_1$ is substantially greater than a width W2 of the second slit $S_2$ and the width W2 of the second slit $S_2$ is greater than a width W3 of the third slit $S_3$, the reduction of the light transmission rate caused by the first slit $S_1$ is greater than the reduction of the light transmission rate caused by the second slit $S_2$ and the reduction of the light transmission rate caused by the second slit $S_2$ is greater than the reduction of the light transmission rate caused by the third slit $S_3$, increasing the consistency of the light transmission rates of the blue light, the green light, and the red light.

However, the disclosure is not intended to limit the disposition locations of the first slit $S_1$, the second slit $S_2$, and the third slit $S_3$. The first slit $S_1$, the second slit $S_2$, and the third slit $S_3$ respectively located in the first pixel area 300B, the second pixel area 300G, and the third pixel area 300R can be disposed on the common electrode layer 322 of the second substrate 320. In other embodiments, the first slit $S_1$, the second slit $S_2$, and the third slit $S_3$ can be simultaneously disposed on the pixel electrodes 312 of the first substrate 310 and the common electrode layer 322 of the second substrate 320.

In the present embodiment, a plurality of first protrusions $P_1$, a plurality of second protrusions $P_2$, and a plurality of third protrusions $P_3$ respectively located in the first pixel areas 300B, the second pixel areas 300G, and the third pixel areas 300R are further selectively disposed on the second substrate 320, and the first protrusions $P_1$, the second protrusions $P_2$, and the third protrusions $P_3$ are disposed on the common electrode layer 322. The first protrusions $P_1$, the second protrusions $P_2$, and the third protrusions $P_3$ have the functions similar to the first slit $S_1$, the second slit $S_2$, and the third slit $S_3$ which change the direction of the nearby electric field.

The electric field at the protrusions is too weak to provide a smaller force on the liquid crystal molecules so as to reduce the light transmission rate. When a width W4 of the first protrusion $P_1$ is substantially greater than a width W5 of the second protrusion $P_2$ and the width W5 of the second protrusion $P_2$ is greater than a width W6 of the third protrusion $P_3$, the reduction of the light transmission rate caused by the first protrusion $P_1$ is greater than the reduction of the light transmission rate caused by the second protrusion $P_2$ and the reduction of the light transmission rate caused by the second protrusion $P_2$ is greater than the reduction of the light transmission rate caused by the third protrusion $P_3$, increasing the consistency of the light transmission rates of the blue light, the green light, and the red light.

However, the disclosure is not intended to limit the disposition locations of the first protrusion $P_1$, the second protrusion $P_2$, and the third protrusion $P_3$. The first protrusion $P_1$, the second protrusion $P_2$, and the third protrusion $P_3$ respectively located in the first pixel area 300B, the second pixel area 300G, and the third pixel area 300R can be disposed on the pixel electrodes 312 of the first substrate 310. In other embodiments, the first protrusion $P_1$, the second protrusion $P_2$, and the third protrusion $P_3$ can be simultaneously disposed on the pixel electrodes 312 of the first substrate 310 and on the common electrode layer 322 of the second substrate 320. Alternatively, the slits and the protrusions can be both implemented in the MVA liquid crystal display.

The Second Embodiment

Figure 4:
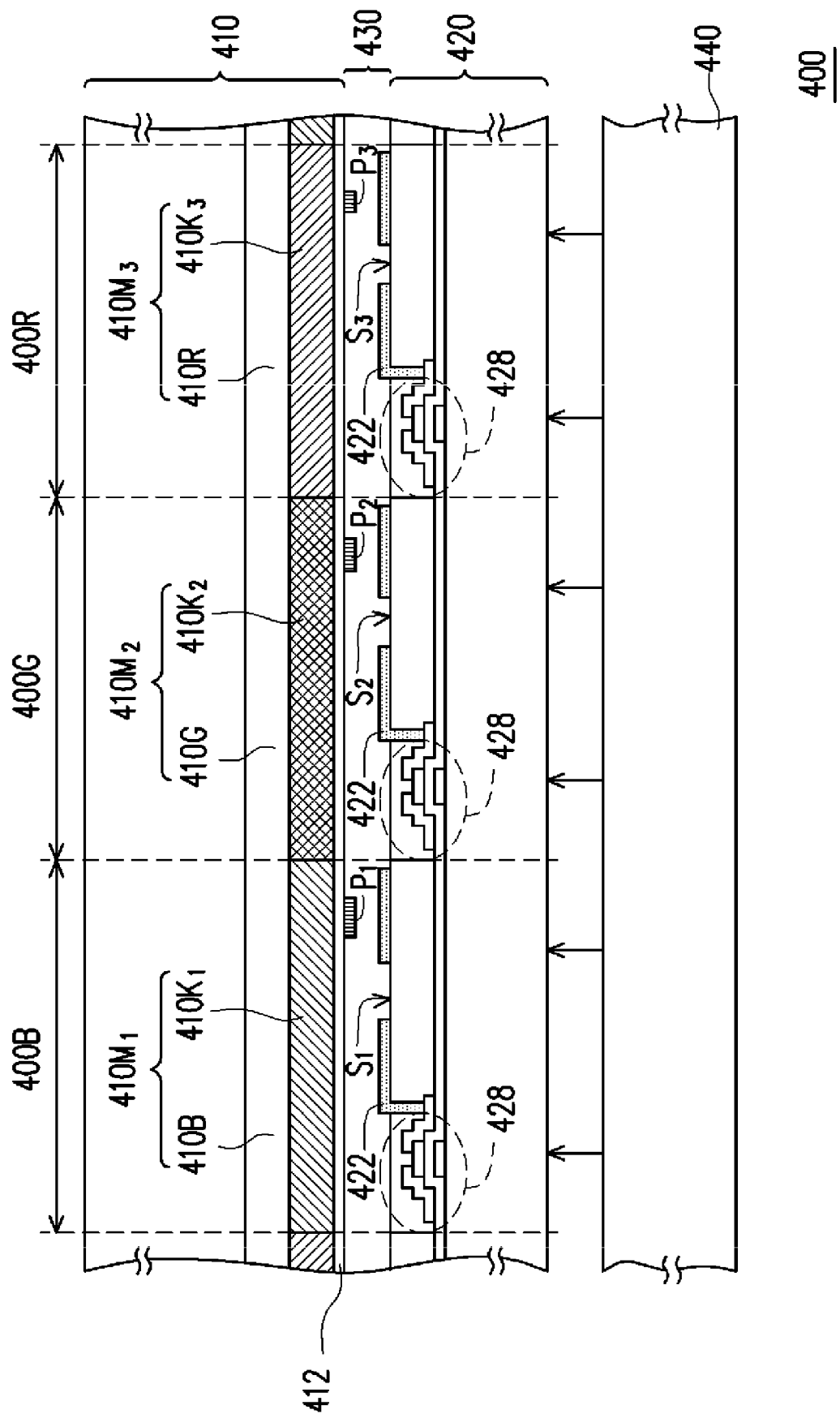
FIG. 4 is a schematic diagram that illustrates a cross-sectional view of a portion of a liquid crystal display according to a second embodiment.

FIG. 4 is a schematic diagram that illustrates a cross-sectional view of a portion of a liquid crystal display according to a second embodiment. Referring to FIG. 4, a liquid crystal display 400 of the present embodiment has a plurality of first pixel areas 400B, a plurality of second pixel areas 400G, and a plurality of third pixel areas 400R, wherein only one first pixel area 400B, one second pixel area 400G, and one third pixel area 400R are illustrated in FIG. 4 as an example. In addition, the liquid crystal display 400 includes a first substrate 410, a second substrate 420 and a liquid crystal layer 430 disposed between the first substrate 410 and the second substrate 420.

A first insulating film $410M_1$, a second insulating film $410M_2$, and a third insulating film $410M_3$ respectively in the first pixel area 400B, the second pixel area 400G, and the third pixel area 400R are disposed on the first substrate 410. A dielectric coefficient of the first insulating film $410M_1$ is substantially greater than a dielectric coefficient of the second insulating film $410M_2$ and the dielectric coefficient of the second insulating film $410M_2$ is substantially greater than a dielectric coefficient of the third insulating film $410M_3$.

The first insulating film $410M_1$ includes a first color filter film 410B and a first dielectric coefficient adjusting film $410K_1$, the second insulating film $410M_2$ includes a second color filter film 410G and a second dielectric coefficient adjusting film $410K_2$, and the third insulating film $410M_3$ includes a third color filter film 410R and a third dielectric coefficient adjusting film $410K_3$. In the present embodiment, the first color filter film 410B is a blue color filter film, the second color filter film 410G is a green color filter film, and the third color filter film 410R is a red color filter film. In addition, a common electrode layer 412 is further disposed on the first substrate 410, wherein the common electrode layer 412 covers the first color filter film 410B, the second color filter film 410G, and the third color filter film 410R. Certainly, in other embodiments, the first color filter film 410B, the second color filter film 410G, and the third color filter film 410R depicted in FIG. 4 can be disposed on the second substrate 420.

For rendering a dielectric coefficient of the first insulating film $410M_1$ greater than a dielectric coefficient of the second insulating film $410M_2$ and rendering the dielectric coefficient of the second insulating film $410M_2$ greater than a dielectric coefficient of the third insulating film $410M_3$, the first dielectric coefficient adjusting film $410K_1$, the second dielectric coefficient adjusting film $410K_2$, and the third dielectric coefficient adjusting film $410K_3$ have the characteristics that a dielectric coefficient of the first dielectric coefficient adjusting film $410K_1$ is substantially greater than a dielectric coefficient of the second dielectric coefficient adjusting film $410K_2$ and the dielectric coefficient of the second dielectric coefficient adjusting film $410K_2$ is substantially greater than a dielectric coefficient of the third dielectric coefficient adjusting film $410K_3$.

Nevertheless, in other embodiments, the dielectric coefficient adjusting films can be selectively disposed in two of the first pixel area 400B, the second pixel area 400G, and the third pixel area 400R to facilitate that the dielectric coefficient of the first insulating film $410M_1$ is substantially greater than the dielectric coefficient of the second insulating film $410M_2$ and the dielectric coefficient of the second insulating film $410M_2$ is substantially greater than the dielectric coefficient of the third insulating film $410M_3$. For example, the first insulating film $410M_1$ can be consisted of the first color filter film 410B and the first dielectric coefficient adjusting film $410K_1$, the second insulating film $410M_2$ can be consisted of the second color filter film 410G and the second dielectric coefficient adjusting film $410K_2$, and the third insulating film $410M_3$ can merely include the third color filter film 410R. The dielectric coefficient of the first dielectric coefficient adjusting film $410K_1$ is greater than the dielectric coefficient of the second dielectric coefficient adjusting film $410K_2$.

As shown in FIG. 4, a plurality of pixel electrodes 422, a plurality of scan lines (not shown), a plurality of data lines (not shown), and a plurality of active devices 428 are further disposed on the second substrate 420 of the present embodiment. It should be noted that the disposition relationships of the scan lines and the data lines on the second substrate 420 of the present embodiment is similar to the disposition relationships of the scan lines 314 and the data lines 316 on the first substrate 310 of the first embodiment so that the related features can be referred to FIG. 3B and the descriptions thereof. The scan lines are substantially parallel and arranged in a first direction, the data lines are substantially parallel and arranged in a second direction, and the data lines and the scan lines define the first pixel areas 400B, the second pixel areas 400G, and the third pixel areas 400R. Each of the active devices 428 are located in the corresponding first pixel area 400B, the corresponding second pixel area 400G, and the corresponding third pixel area 400R, and driven by the corresponding scan line. In another aspect, each of the pixel electrodes 422 are located in the corresponding first pixel area 400B, the corresponding second pixel area 400G, and the corresponding third pixel area 400R, and electrically connected to the corresponding active device 428 to receive a signal transmitted through the corresponding data line.

Taking a transmissive liquid crystal display or a transreflective liquid crystal display as an example, the liquid crystal display 400 of the present embodiment as shown in FIG. 4 further includes a backlight module 440, and the first substrate 410, the second substrate 420, and the liquid crystal layer 430 are disposed on the backlight module 440, wherein the backlight module 440 provides the light source of the liquid crystal display 400. However, in other embodiments, the liquid crystal display 400 can be a reflective liquid crystal display. That is to say, the method or the manner how the liquid crystal display 400 of the present embodiment obtains the light source is not restricted.

The backlight module 440 provides the backlight source to the first pixel area 400B, the second pixel area 400G, and the third pixel area 400R so that the liquid crystal display 400 can display an image when the active devices 428 in the first pixel area 400B, the second pixel area 400G, and the third pixel area 400R are driven by the corresponding scan line to render the corresponding pixel electrodes 422 receive the corresponding signals transmitted through the corresponding data lines.

Specifically, the first insulating film $410M_1$, the second insulating film $410M_2$, and the third insulating film $410M_3$ respectively have a blue color filter film, a green color filter film, and a red color filter film so that the light of the backlight source is transformed into a blue light, a green light, and a red light after passing through the first insulating film $410M_1$, the second insulating film $410M_2$, and the third insulating film $410M_3$. In addition, the dielectric coefficient of the first dielectric coefficient adjusting film $410K_1$ in the first insulating film $410M_1$ is substantially greater than the dielectric coefficient of the second dielectric coefficient adjusting film $410K_2$ in the second insulating film $410M_2$ and the dielectric coefficient of the second dielectric coefficient adjusting film $410K_2$ in the second insulating film $410M_2$ is substantially greater than the dielectric coefficient of the third dielectric coefficient adjusting film $410K_3$ in the third insulating film $410M_3$. Therefore, when a portion of the light of the backlight source respectively enters the first pixel area 400B and the third pixel area 400R, owing that an actual applied voltage to the liquid crystal layer in the first pixel area 400B is smaller than that applied to the liquid crystal layer in the third pixel area 400R, less portion of the light passes through the first color filter film 410B and more portion of the light passes through the third color filter film 410R. Therefore, the difference of the light transmission rates of the blue light, the green light, and the red light generated by the light passing through the first pixel area 400B, the second pixel area 400G, and the third pixel area 400R is reduced so as to mitigate the color shifting of the liquid crystal display 400 caused by the difference of the light transmission rates of different color light during displaying.

The abovementioned first pixel area 400B, the second pixel area 400G, and the third pixel area 400R can be implemented in an MVA liquid crystal display. In other words, the designs of the slits or the protrusions referred to the first embodiment can be adopted in the first pixel area 400B, the second pixel area 400G, and the third pixel area 400R.

The Third Embodiment

Figure 5:
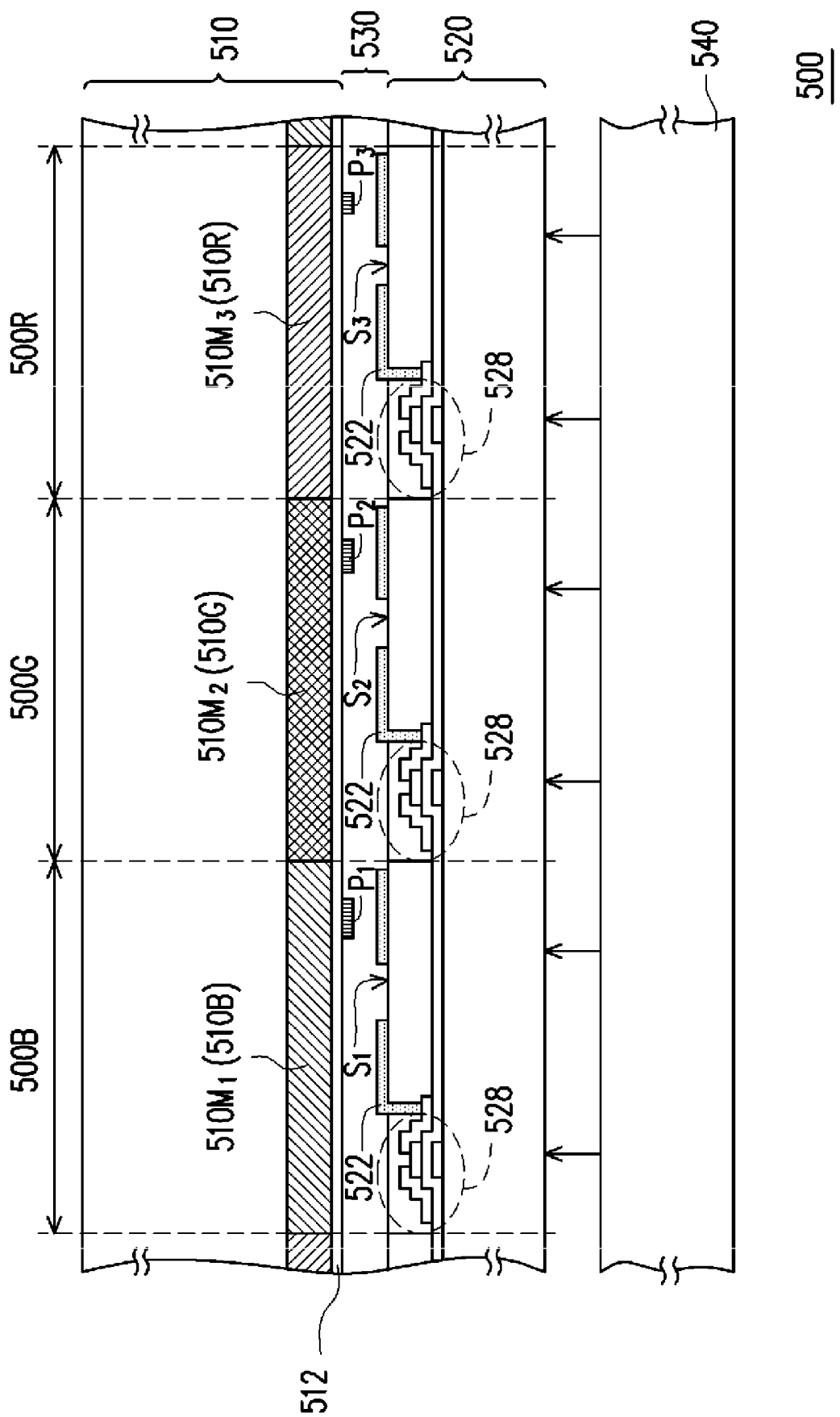
FIG. 5 is a schematic diagram that illustrates a cross-sectional view of a portion of a liquid crystal display according to a third embodiment.

FIG. 5 is a schematic diagram that illustrates a cross-sectional view of a portion of a liquid crystal display according to a third embodiment. Referring to FIG. 5, a liquid crystal display 500 of the present embodiment has a plurality of first pixel areas 500B, a plurality of second pixel areas 500G, and a plurality of third pixel areas 500R, wherein only one first pixel area 500B, one second pixel area 500G, and one third pixel area 500R are illustrated in FIG. 5 as an example. In addition, the liquid crystal display 500 includes a first substrate 510, a second substrate 520 and a liquid crystal layer 530 disposed between the first substrate 510 and the second substrate 520.

A first insulating film $510M_1$, a second insulating film $510M_2$, and a third insulating film $510M_3$ respectively in the first pixel area 500B, the second pixel area 500G, and the third pixel area 500R are disposed on the first substrate 510. A dielectric coefficient of the first insulating film $510M_1$ is substantially greater than a dielectric coefficient of the second insulating film $510M_2$ and the dielectric coefficient of the second insulating film $510M_2$ is substantially greater than a dielectric coefficient of the third insulating film $510M_3$.

The first insulating film $510M_1$ is a first color filter film 510B, the second insulating film $510M_2$ is a second color filter film 510G, and the third insulating film $510M_3$ is a third color filter film 510R. In addition, a common electrode layer 512 is further disposed on the first substrate 510, wherein the common electrode layer 512 covers the first color filter film 510B, the second color filter film 510G, and the third color filter film 510R. Certainly, in other embodiments, the first color filter films 510B, the second color filter films 510G, and the third color filter films 510R depicted in FIG. 5 can be disposed on the second substrate 520.

As shown in FIG. 5, a plurality of pixel electrodes 522, a plurality of scan lines (not shown), a plurality of data lines (not shown), and a plurality of active devices 528 are further disposed on the second substrate 520 of the present embodiment. It should be noted that the disposition relationships of the scan lines and the data lines on the second substrate 520 of the present embodiment is similar to the disposition relationships of the scan lines 314 and the data lines 316 on the first substrate 310 of the first embodiment so that the related features can be referred to FIG. 3B and the descriptions thereof. The scan lines are substantially parallel and arranged in a first direction, the data lines are substantially parallel and arranged in a second direction, and the data lines and the scan lines define the first pixel area 500B, the second pixel area 500G, and the third pixel area 500R. Each of the active devices 528 are located in the corresponding first pixel area 500B, the corresponding second pixel area 500G, and the corresponding third pixel area 500R, and driven by the corresponding scan line. In another aspect, each of the pixel electrodes 522 are located in the corresponding first pixel area 500B, the corresponding second pixel area 500G, and the corresponding third pixel area 500R, and electrically connected to the corresponding active device 528 to receive a signal transmitted through the corresponding data line.

Taking a transmissive liquid crystal display or a transreflective liquid crystal display as an example, the liquid crystal display 500 of the present embodiment as shown in FIG. 5 further includes a backlight module 540, and the first substrate 510, the second substrate 520, and the liquid crystal layer 530 are disposed on the backlight module 540, wherein the backlight module 540 provides the light source of the liquid crystal display 500. However, in other embodiments, the liquid crystal display 500 can be a reflective liquid crystal display. That is to say, the method or the manner how the liquid crystal display 500 of the present embodiment obtains the light source is not restricted.

The backlight module 550 provides the backlight source to the first pixel area 500B, the second pixel area 500G, and the third pixel area 500R so that the liquid crystal display 500 can display an image when the active devices 528 in the first pixel area 500B, the second pixel area 500G, and the third pixel area 500R are driven by the corresponding scan line to render the corresponding pixel electrodes 522 receive the corresponding signals transmitted through the corresponding data lines.

In the present embodiment, the first color filter film 510B is a blue color filter film, the second color filter film 510G is a green color filter film, and the third color filter film 510R is a red color filter film so that the light of the backlight source is transformed in to a blue light, a green light, and a red light after passing through the first insulating film $510M_1$, the second insulating film $510M_2$, and the third insulating film $510M_3$. Furthermore, a dielectric coefficient of the first insulating film $510M_1$ is substantially greater than a dielectric coefficient of the second insulating film $510M_2$ and the dielectric coefficient of the second insulating film $510M_2$ is substantially greater than a dielectric coefficient of the third insulating film $510M_3$. Therefore, when a portion of the backlight source respectively enters the first pixel area 500B and the third pixel area 500R, the first insulating film $510M_1$ with greater dielectric coefficient renders an actual applied voltage to the liquid crystal layer in the first pixel area 500B smaller than that applied to the liquid crystal layer in the third pixel area 500R so that less portion of the light passes through the first color filter film 510B and more portion the light passes through the third color filter film 510R. Therefore, the light transmission rates of the blue light, the green light, and the red light generated by the light passing through the first pixel area 500B, the second pixel area 400G, and the third pixel area 400R are more consistent so as to mitigate the color shifting of the liquid crystal display 500 caused by the difference of the light transmission rates of different color light during displaying.

The abovementioned first pixel area 500B, the second pixel area 500G, and the third pixel area 500R can be implemented in an MVA liquid crystal display. In other words, the designs of the slits or the protrusions referred to the first embodiment can be adopted in the first pixel area 500B, the second pixel area 500G, and the third pixel area 500R.

In summary, a plurality of pixel areas having different dielectric coefficients are defined on the substrate of the liquid crystal display by disposing different materials according to the disclosure so that the light transmission rates of different color light are more consistent when the liquid crystal display displays different color light. Furthermore, in the second embodiment, the disposition of the dielectric coefficient adjusting films facilitates the adjustment of the dielectric coefficient of the liquid crystal display in each pixel area and increases the design flexibility on the dielectric coefficient of each pixel area. Furthermore, in the third embodiment, the original color filter films are used to change the dielectric coefficients of the liquid crystal display in different pixel areas, which simplify manufacturing complexity and reduce manufacturing cost and time. The disposition locations of the materials having different dielectric coefficients are not restricted. The materials having different dielectric coefficients can be disposed on the color filter substrate, the thin film transistor substrate, or the thin film transistor substrate combined with a color filter, which is capable of changing the actual voltage applied to the liquid crystal molecules in the corresponding pixel area.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A liquid crystal display having a plurality of first pixel areas, a plurality of second pixel areas, and a plurality of third pixel areas, the liquid crystal display comprising:
   a first substrate;
   a plurality of first insulating films in the first pixel areas disposed on the first substrate;
   a plurality of second insulating films in the second pixel areas disposed on the first substrate;
   a plurality of third insulating films in the third pixel areas disposed on the first substrate, wherein a dielectric coefficient of the first insulating films is greater than a dielectric coefficient of the second insulating films, and the dielectric coefficient of the second insulating films is greater than a dielectric coefficient of the third insulating films;
   a second substrate; and
   a liquid crystal layer disposed between the first substrate and the second substrate.

2. The liquid crystal display of claim 1, wherein each of the first insulating films is a first color filter film, each of the second insulating films is a second color filter film, and each of the third insulating films is a third color filter film.

3. The liquid crystal display of claim 2, wherein the first color filter films are blue color filter films, the second color filter films are green color filter films, and the third color filter films are red color filter films.

4. The liquid crystal display of claim 1, wherein each of the first insulating films comprises a first color filter film and a first dielectric coefficient adjusting film, each of the second insulating films comprises a second color filter film and a second dielectric coefficient adjusting film, each of the third insulating films is a third color filter film, and dielectric coefficients of the first dielectric coefficient adjusting films are greater than dielectric coefficients of the second dielectric coefficient adjusting films.

5. The liquid crystal display of claim 4, wherein the first color filter films are blue color filter films, the second color filter films are green color filter films, and the third color filter films are red color filter films.

6. The liquid crystal display of claim 1, wherein each of the first insulating films comprises a first color filter film and a first dielectric coefficient adjusting film, each of the second insulating films comprises a second color filter film and a second dielectric coefficient adjusting film, each of the third insulating films comprises a third color filter film and a third dielectric coefficient adjusting film,
   wherein the dielectric coefficients of the first dielectric coefficient adjusting films are greater than the dielectric coefficients of the second dielectric coefficient adjusting films, and the dielectric coefficients of the second dielectric coefficient adjusting films are greater than the dielectric coefficients of the third dielectric coefficient adjusting films.

7. The liquid crystal display of claim 6, wherein the first color filter films are blue color filter films, the second color filter films are green color filter films, and the third color filter films are red color filter films.

8. The liquid crystal display of claim 1, wherein a plurality of pixel electrodes, a plurality of scan lines, a plurality of data lines, and a plurality of active devices are further disposed on one of the first substrate and the second substrate, wherein the scan lines are substantially parallel and arranged in a first direction, the data lines are substantially parallel and arranged in a second direction, and the data lines and the scan lines define the first pixel areas, the second pixel areas, and the third pixel areas, wherein each of the active devices is located in the corresponding first pixel area, the corresponding second pixel area, or the corresponding pixel area, and driven by the corresponding scan line, and wherein each of the pixel electrodes is located in the corresponding first pixel area, the corresponding second pixel area, or the corresponding pixel area, and electrically connected to the corresponding active device to receive a signal transmitted through the corresponding data line.

9. The liquid crystal display of claim 8, wherein the pixel electrodes located in the first pixel areas have a plurality of first slits, the pixel electrodes located in the second pixel areas have a plurality of second slits, and the pixel electrodes located in the third pixel areas have a plurality of third slits, and wherein the widths of the first slits are greater than the widths of the second slits, and the widths of the second slits are greater than the widths of the third slits.

10. The liquid crystal display of claim 8, wherein a plurality of first protrusions in the first pixel areas, a plurality of second protrusions in the second pixel areas, and a plurality of third protrusions in the third pixel areas are further disposed on the first substrate, wherein the first protrusions, the second protrusions, and the third protrusions are disposed on the pixel electrodes, and wherein the widths of the first protrusions are greater than widths of the second protrusions, and the widths of the second protrusions are greater than the widths of the third protrusions.

11. The liquid crystal display of claim 8, wherein the common electrode layer has a plurality of first slits in the first pixel areas, a plurality of second slits in the second pixel areas, and a plurality of third slits in the third pixel areas, and wherein widths of the first slits are greater than widths of the second slits, and the widths of the second slits are greater than widths of the third slits.

12. The liquid crystal display of claim 8, wherein a plurality of first protrusions in the first pixel areas, a plurality of second protrusions in the second pixel areas, and a plurality of third protrusions in the third pixel areas are further disposed on the second substrate, wherein the first protrusions, the second protrusions, and the third protrusions are disposed on the common electrode layer, and wherein the widths of the first protrusions are greater than the widths of the second protrusions, and the widths of the second protrusions are greater than the widths of the third protrusions.

13. The liquid crystal display of claim 8, wherein a plurality of first color filter films in the first pixel areas, a plurality of second color filter films in the second pixel areas, and a plurality of third color filter films in the third pixel areas are further disposed on the second substrate, and wherein the common electrode layer covers the first color filter films, the second color filter films, and the third color filter films.

14. The liquid crystal display of claim 1, wherein a plurality of pixel electrodes, a plurality of scan lines, a plurality of data lines, and a plurality of active devices are further disposed on the second substrate, wherein the scan lines are substantially parallel and arranged in a first direction, and the data lines are substantially parallel and arranged in a second direction, wherein the scan lines and the data lines define the first pixel areas, the second pixel areas, and the third pixel areas, wherein each of the active devices is located in the corresponding first pixel area, the corresponding second pixel area, or the corresponding third pixel area, and driven by the corresponding scan line, wherein each of the pixel electrodes is located in the corresponding first pixel area, the corresponding second pixel area, or the corresponding third pixel area, and electrically connected to the corresponding active device to receive a signal transmitted through the corresponding data line; and wherein a common electrode layer is further disposed on the first substrate.

15. The liquid crystal display of claim 14, wherein the pixel electrodes located in the first pixel areas have a plurality of first slits, the pixel electrodes located in the second pixel areas have a plurality of second slits, and the pixel electrodes located in the third pixel areas have a plurality of third slits, and wherein the widths of the first slits are greater than the widths of the second slits, and the widths of the second slits are greater than the widths of the third slits.

16. The liquid crystal display of claim 14, wherein a plurality of first protrusions in the first pixel areas, a plurality of second protrusions in the second pixel areas, and a plurality of third protrusions in the third pixel areas are further disposed on the second substrate, wherein the first protrusions, the second protrusions, the third protrusions are disposed on the pixel electrodes, and wherein the widths of the first protrusions are greater than the widths of the second protrusions, and the widths of the second protrusions are greater than the widths of the third protrusions.

17. The liquid crystal display of claim 14, wherein the common electrode layer has a plurality of first slits in the first pixel areas, a plurality of second slits in the second pixel areas, and a plurality of third slits in the third pixel areas, and wherein the widths of the first slits are greater than the widths of the second slits, and the widths of the second slits are greater than the widths of the third slits.

18. The liquid crystal display of claim 14, wherein a plurality of first protrusions in the first pixel areas, a plurality of second protrusions in the second pixel areas, and a plurality of third protrusions in the third pixel areas are further disposed on the first substrate, wherein the first protrusions, the second protrusions, the third protrusions are disposed on the common electrode layer, and wherein the widths of the first protrusions are greater than widths of the second protrusions, and the widths of the second protrusions are greater than the widths of the third protrusions.

19. The liquid crystal display of claim 14, wherein a plurality of first color filter films in the first pixel areas, a plurality of second color filter films in the second pixel areas, and a plurality of third color filter films in the third pixel areas are further disposed on the second substrate.

20. The liquid crystal display of claim 1, further comprising a backlight module, and wherein the first substrate, the second substrate, and the liquid crystal layer are disposed on the backlight module.

* * * * *